United States Patent [19]

Bolieau

[11] Patent Number: 4,578,247
[45] Date of Patent: Mar. 25, 1986

[54] MINIMUM BULK, LIGHT WEIGHT WELDED ALUMINUM INFLATOR

[75] Inventor: Christopher W. Bolieau, Brigham City, Utah

[73] Assignee: Morton Thiokol, Inc., Chicago, Ill.

[21] Appl. No.: 665,856

[22] Filed: Oct. 29, 1984

[51] Int. Cl.$^4$ ............................ B01J 7/00; F42B 3/04
[52] U.S. Cl. .................................. 422/165; 102/531; 280/741; 422/166
[58] Field of Search ............... 422/165, 166, 167, 305; 280/731, 732, 736, 741; 102/530, 531

[56] References Cited

U.S. PATENT DOCUMENTS

| | | | |
|---|---|---|---|
| 3,958,949 | 5/1976 | Plantif et al. | 102/531 |
| 3,985,076 | 10/1976 | Schneiter et al. | 102/531 |
| 3,986,456 | 10/1976 | Doin et al. | 422/166 |
| 4,116,466 | 9/1978 | Gehrig | 422/165 |
| 4,131,299 | 12/1978 | Ono et al. | 280/741 |
| 4,296,084 | 10/1981 | Adams et al. | 422/166 |

FOREIGN PATENT DOCUMENTS 41369  12/1981  European Pat. Off. ............ 422/166

Primary Examiner—S. Leon Bashore
Assistant Examiner—K. M. Hastings
Attorney, Agent, or Firm—Gerald K. White

[57] ABSTRACT

A generally cylindrical housing construction for a light weight gas generator of minimum bulk includes two subassemblies, each of which have first and second concentric cylinders depending from a flat wall and which are joined together by inertia welding to form a central igniter chamber and an outer annular chamber. The outer chamber is divided into three axially extending annular chambers by two flat annular barriers. Solid fuel is contained in a first annular chamber. Communication between the three annular chambers is provided by openings in the barriers, the openings in the barrier adjacent the solid fuel being disposed on a circle adjacent the outer edge thereof while the openings in the other barrier are disposed on a circle adjacent the inner edge. A cooling and filtering means is provided in each of the second and third annular chambers, with an air space between the two subassemblies for clearance during welding. Upon ignition, flame flows through openings in the wall of the igniter chamber into the solid fuel and ignites it. Pressure developed in the first annular chamber moves the adjacent barrier and cooling and filtering means against the second barrier, closing the clearance space and forcing the generated gas to flows radially inwardly through the first cooling and filtering means before passing through the inwardly located openings in the second barrier into the second cooling and filtering means. Gas flows radially outwardly through the second cooling and filtering means to the exit openings of the generator.

7 Claims, 2 Drawing Figures

MINIMUM BULK, LIGHT WEIGHT WELDED ALUMINUM INFLATOR

BACKGROUND OF THE INVENTION

1. Field of the Invention

The present invention relates to gas generators or inflators that utilize the combustion of a solid fuel gas generant composition for the generation of a gas for the rapid inflation of vehicle passive restraint inflatable crash protection bags, and more particularly to an improved housing construction for such generators.

2. Description of the Prior Art

Many forms of gas generators or inflators that utilize combustible solid fuel gas generant compositions for the inflation of inflatable crash protection or "air bag" restraint systems are known in the prior art. One form of such gas generator includes as main component parts a concentric arrangement of annular combustion chambers bounded by an outer casing or housing structure, as disclosed in U.S. Pat. No. 4,296,084, granted to G. V. Adams and F. E. Schneiter and assigned to the assignee of the present invention. The combustion chamber encloses a rupturable container or cartridge that is hermetically sealed and contains therein solid gas generant material in pelletized form, surrounded by an annular filter. The generator further includes a central ignition or initiator tube, and an annular or toroidal filter chamber adjoining and encircling the combustion chamber with an inner casing or housing structure in close surrounding and supporting relationship to the rupturable container, the inner casing being formed by a cylinder having uniformly spaced peripheral ports or orifices near one end. These orifices provide exit holes for the flow of inflation gas from the combustion chamber.

Gas generators must withstand enormous thermal and mechanical stresses for a short period during the gas generation process. Accordingly, gas generators in current use for filling automobile or other vehicle crash bags have been very heavy, being fabricated from thick-walled steel for the casing and other housing structural components, with the structural components being joined together by screw threads, roll crimping or welding.

Recent emphasis, however, on weight reduction in automobiles has created a need, and a demand, for a lighter weight crash bag gas generator. This is of particular importance in a system for driver crash protection where the gas generator is mounted on the steering wheel where bulk becomes a factor and the availability of a lighter weight generator enables a reduction to be made in the weight of the steering wheel and steering column on which the generator is mounted.

An improvement in gas generators of the type disclosed in U.S. Pat. No. 4,296,084 is disclosed and is being claimed in pending U.S. application Ser. No. 595,774, filed Apr. 2, 1984 by G. V. Adams and W. J. Ahlf and assigned to the assignee of the present invention. In application Ser. No. 595,774 there is provided an improvement that facilitates the substitution of aluminum for the steel structural components of the prior art, and hence, enables a significant reduction in the weight of the gas generator to be made. Specifically, there is provided a housing construction comprising two subassemblies, specifically, first and second aluminum structural components, the first component being a diffuser shell and the second a base shell. The first structural component or diffuser shell has three integrally formed concentric cylinders which form the generator structural walls and define chambers therein containing the solid fuel or gas generant, ignition materials, and filters and provide exit openings or port holes for the passage of inflation gases from chamber to chamber and into the protective air bag. The second structural component or base shell contains an electric initiator and generator attachment flange and provides three concentric mating surfaces for the diffuser shell. The three concentric cylinders of the diffuser shell are simultaneously joined to the concentric mating surfaces of the base shield by a single inertia welding operation thereby facilitating the manufacture of the gas generator on a large scale, inexpensively.

The prior art gas generators, however, are characterized by concentric sequential arrangements of the igniter, the solid fuel, the filtering means and the cooling means. Such structures have certain disadvantages in that they tend to be bulky and heavier than desirable, and require the joining together in a sealing manner of three concentric mating surfaces. The prior art structures tend to be bulky and heavier than desirable because for a given generator outer housing height and diameter, the maximum volume for the solid fuel is not obtained with the described sequential arrangement of the solid fuel, the filter means and the cooling means. Thus, for a given charge of solid fuel a greater generator outer housing height is required than would be the case were the structural arrangement such that maximum volume for the solid fuel were obtained.

SUMMARY OF THE INVENTION

An object of the invention is to provide an improvement in the housing construction for a gas generator that overcomes the foregoing disadvantages of the prior art gas generators.

A more specific object of the invention is to provide an improved housing construction for a gas generator that, for a given generator height and outer housing diameter, provides maximum volume for the solid fuel charge thus enabling a reduction in the bulk, and weight also, of the gas generator for a given material from which the housing construction is fabricated.

Another specific object of the invention is to provide such an improved housing construction for a gas generator involving two subassemblies that may be joined together with two simultaneous inertia welds.

A further specific object of the invention is to provide such an improved housing construction for a gas generator that facilitates the substitution of aluminum for the steel structural components employed in the prior art and thus enables a further reduction in the weight of the generator to be made.

Still another object of the invention is to provide such an improved gas generator housing construction that meets the high reliability standards for vehicle passive restraint inflatable crash protection systems and at the same time can be manufacture in high production rates at low cost.

In accomplishing these and other objectives of the present invention, there is provided for the gas generator a housing construction comprising first and second structural components or shells, specifically, a first or diffuser shell and a second or base shell. Both shells may be forged, heat treated and then final machined. The first shell or structural component forms a first subassembly and includes two concentric cylinders that extend from a first common wall means to form structural walls of the generator and provide exit openings or port holes for the passage of inflation gas into the air bag structure that is to be inflated. The second shell or structural component forms a second subassembly and includes two concentric cylinders that extend from a second common wall means to form structural walls of the inflator and to provide mating surfaces for the concentric cylinders of the first structural component to form therebetween inner and outer concentric chambers, with the inner chamber containing initiator means and ignition materials.

There is provided, in addition, in the improved housing construction of the invention third and fourth structural components or barriers both of which are annular and substantially planar in form. The third structural component is positioned in the outer chamber of the housing construction in the second structural component to provide in cooperation with the second common wall means a first annular chamber containing a charge of solid fuel. The fourth structural component is positioned in the outer chamber of the housing construction in the first structural component to provide in cooperation with the first common wall means a third annular chamber containing filter means. A second annular chamber that is concentric with the first and third annular chambers is formed between the third and fourth structural components or barriers. Uniformly spaced port holes are provided in each of the third and fourth structural components for the passage of inflation gases between the concentric annular chambers.

In accordance with the invention, the two subassemblies may be joined together with two simultaneous inertia welds.

BRIEF DESCRIPTION OF THE DRAWING

Having summarized the invention, a detailed description of the invention follows with reference being made to the accompanying drawings which form part of the specification, of which.

DESCRIPTION OF THE PREFERRED EMBODIMENT

Figure 1:
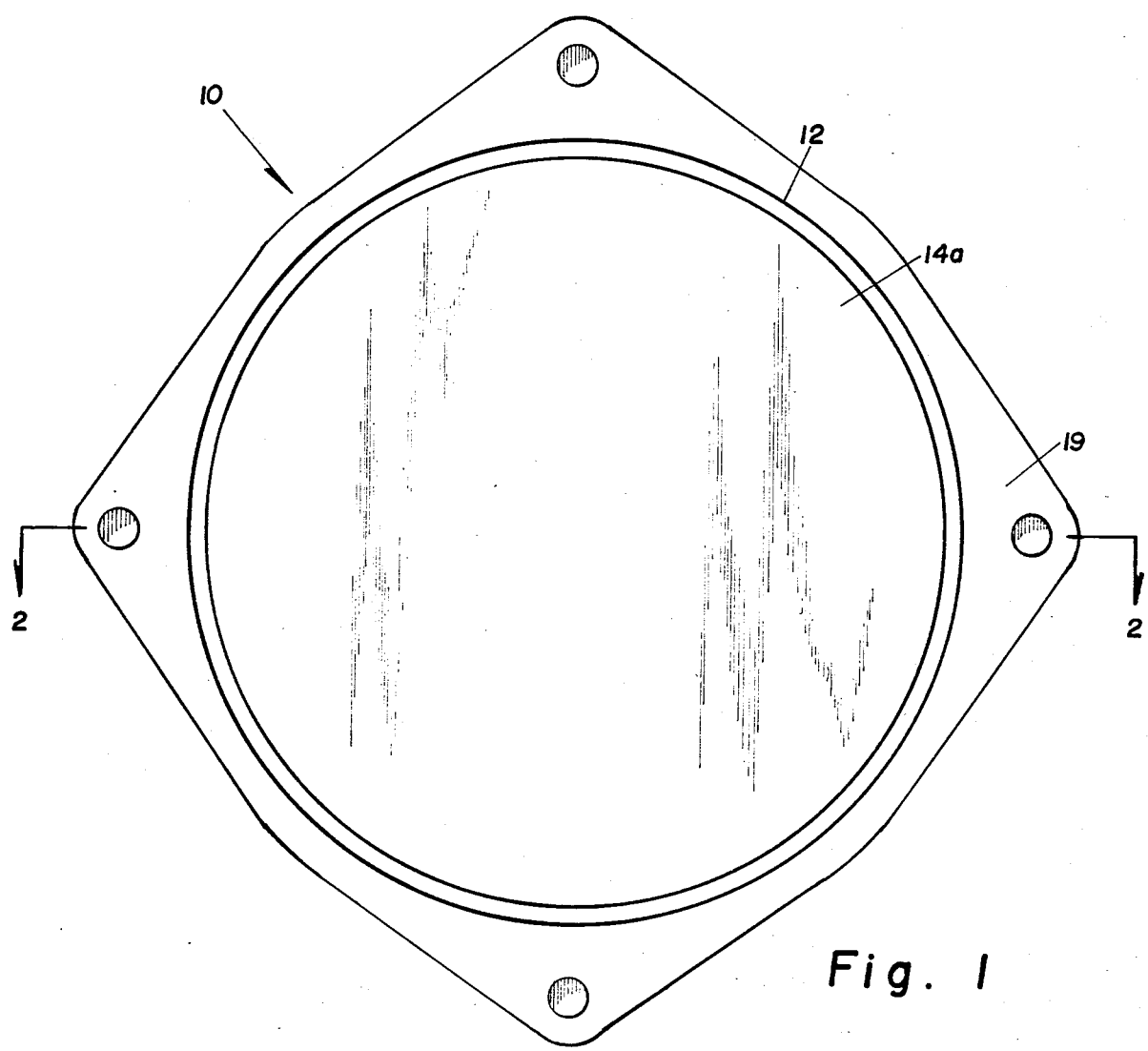
FIG. 1 is a top plan view of the improved gas generator embodying the invention.
Figure 2:
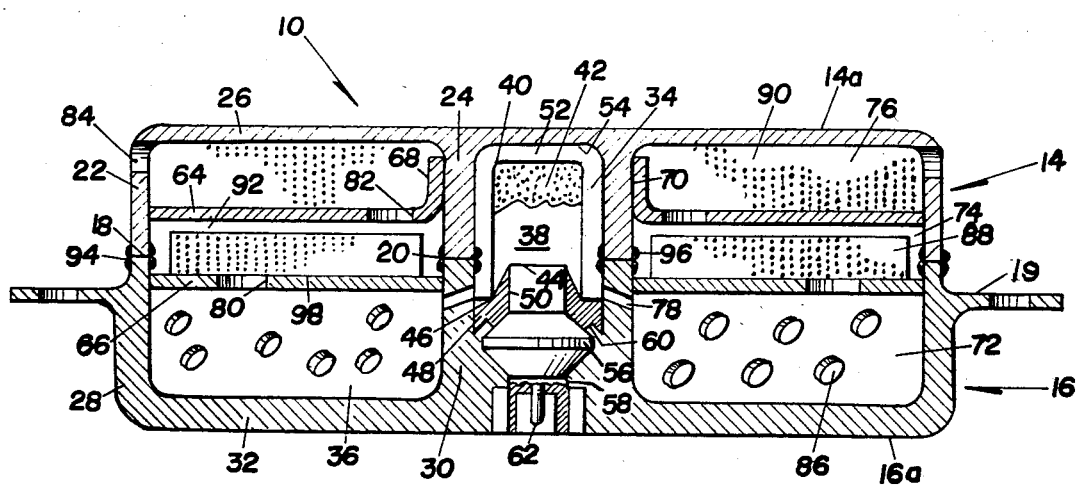
FIG. 2 is a cross-sectional view of the gas generator of FIG. 1 taken along the lines 2—2 of FIG. 1.

The gas generator assembly 10 according to the present invention has a generally cylindrical external outline, as shown in FIGS. 1 and 2, and includes a housing construction 12 comprising two subassemblies 14 and 16. The subassemblies, as shown in FIG. 2 include a first structural metal component or upper shell, designated 14a, and a second structural metal component or lower shell, designated 16a which are joined together by two concentric inertia welds shown at 18 and 20 to assemble the housing construction 12 of the generator assembly 10. The inertia welds 18 and 20 are performed simultaneously in a single inertia welding operation.

The upper shell 14a may be formed by forging with first and second concentric cylinders 22 and 24, respectively, which extend downwardly, as seen in FIG. 2 from a first common flat upper wall 26. Similarly, the lower shell 16a may be formed by forging with third and fourth concentric cylinders 28 and 30, respectively. Each of cylinders 28 and 30 extend upwardly from a second common flat wall 32 to form a separate weld interface with a respectively associated end of the downwardly extending cylinders 22 and 24. Inner cylinders 24 and 30, in cooperation with walls 26 and 32, form an inner cylindrical igniter chamber 34 for the gas generator 10. The outer cylinders 22 and 28, in cooperation with walls 26 and 32 and inner cylinders 24 and 30, form an outer chamber 36 having an annular or toroidal shape. The lower shell 16a includes an interface attachment flange 19 which may be used to attach the gas generator assembly 10 to a vehicle the occupants of which are to be protected.

Positioned within the igniter chamber 34 is an igniter charge assembly 38 comprising a rupturable closed aluminum container 40 containing ignitable material 42. Container 40 may be hermetically sealed against moisture, has a recess or cavity 44 formed in the bottom 46 thereof, and is retained in chamber 34 by a retaining ring 48. Retaining ring 48 has a shape conforming to the shape of the bottom 46 of container 40 and is inserted within the inner cylinder 30 of lower shell 16a, in press fit relation therewith. Container 40 may be attached to retaining ring 48 in any convenient manner, as for example, by a suitable adhesive 50. An air space 52 is provided between the upper end of container 40 and the inner surface 54 of wall 26 to provide clearance during inertia welding of subassemblies 14 and 16 together.

Although various pyrotechnic materials may be employed for igniter material 42, a preferred material is a granular mixture of 25% by weight of boron and 75% of potassium nitrate. This mixture has been found to burn with a very hot flame that is suitable for igniting the solid fuel gas generant material employed in the gas generator 10, as described hereinafter.

Extending into the recess 44 of container 40 is an initiator 56. Initiator 56, as shown, has a conically shaped lower portion and is mounted in a hole 58 having a mating conically shaped upper portion, the hole 58 being provided at a central location in wall 32. Initiator 56 is retained in hole 58 by a crimp 60 that is formed on the inner surface of cylinder 30 at the upper end of hole 58 and which overlaps and engages the conically shaped upper portion of initiator 56. Initiator 56 may be a conventional electric squib having a pair of energizing electrical terminals, one, designated 62, of which only is shown, that are adapted for plug-in connection to external crash sensor means (not shown).

Positioned within the annular or toroidal chamber 36 are third and fourth structural components or barriers 64 and 66. Each of barriers 64 and 66 consists of an annular metallic member that may be made of aluminum and is substantially planar in form with the barrier 64 including a short cylindrical portion 68 at the center thereof. The barrier 64, as shown, is positioned in press fit relation within the first structural component or upper shell 14a with the end of the cylindrical portion 68 in engagement with the outer surface 70 of wall 24. Barrier 66 is press fit within the second structural component or lower shell 16a, in spaced relation with respect to the barrier 64. With this arrangement the outer chamber 36 is divided into three separate, tandemly arranged, concentric annular or toroidal chambers, which chambers, for convenience of illustration, are designated by reference numerals 72, 74 and 76, respectively. It will be noted that the volume of chamber 72, particularly, extends out to the full inner diameter of cylinder 28, thus providing maximum volume for chamber 72 for a given height.

A plurality of uniformly spaced exit openings or ports are provided in each of inner cylinder 30 of lower shell 16a, structural components 64 and 66, and outer cylinder 22 of upper shell 14a, through which ports the generated gases flow from chamber to chamber of the generator assembly 10 and into a protective air bag (not shown) to be filled. Specifically, there is provided in cylinder 30 a plurality of ports 78 that are uniformly spaced around the circumference thereof and provide a communicating passage from the flow of ignition gases for ignition chamber 34 to annular chamber 72. For providing a flow of generator gases between chambers 72, 74 and 76, there are provided a plurality of uniformly spaced ports, designated 82 and 80, respectively, in barriers 64 and 66. Ports 80 and 82 are disposed on circles having the longitudinal axis of igniter chamber 34 at the center thereof with the circle on which ports 80 are disposed having a substantially greater diameter than that on which ports 82 are disposed. Thus, ports 80 are positioned closer to cylinder 28 than to cylinder 30 and ports 82 are positioned closer to cylinder 24 than to cylinder 22, as shown. A plurality ports 84 are uniformly spaced about the circumference of outer cylinder 22 at the upper end thereof adjacent the first common flat wall 26.

Contained within annular chamber 72 are uniformly distributed pellets 86 of a gas generant composition which may be any one of a number of compositions meeting the requirements of burning rate, nontoxicity, and flame temperature. One composition that may be utilized is that described in U.S. Pat. No. 4,203,787, granted to F. E. Schneiter and G. F. Kirchoff, Jr. Another composition that may advantageously be utilized is that described in U.S. Pat. No. 4,369,079 to Graham C. Shaw. U.S. Pat. Nos. 4,203,787 and 4,369,079 are both assigned to the assignee of the present invention. Since chamber 72 provides a maximum volume for a given chamber diameter and height, it will be apparent to those skilled in the art that a maximum gas generating charge of pellets 86 may be provided in chamber 72 for a given height of the chamber, and hence, bulk of the gas generating assembly 10. While not so shown, it will be understood that if desired, the gas generant pellets 86 may be provided within a rupturable hermetically sealed aluminum cartridge of toroidal shape conforming to the shape of chamber 72 thereby to protect the pellets 86 against the effects of moisture.

Positioned within, annular chambers 74 and 76 are cooling and filtering devices 88 and 90. Devices 88 and 90 may each comprise annular layers of wire screen that may be formed in any suitable manner. For example, devices 88 and 90 may be either rolled screens, a stack of donut-shaped screens, or a preform of metal foam. An air space 92 is provided between device 88 and the lower surface of barrier 64 for clearance during inertia welding of the subassemblies 14 and 16.

It is noted that during the formation of the inertia welds 18 and 20, flashing indicated respectively at 94 and 96 is formed around the ends of the mating outer concentric cylinders 22 and 28 and the inner concentric cylinder 24 and 30.

In accordance with the invention, the gas generator assembly 10 is welded in the wholly loaded condition. During the inertia welding operation, the loaded subassembly 16 containing the igniter charge 38, initiator 56, gas generator pellets 86, annular barrier member 66 and cooling and filtering device 88 is held stationary in an inverted position in the inertia welding machine. Device 88 may be fixedly attached to barrier member 66 in any suitable manner, as by a suitable adhesive indicated at 98.

In the inertia welding process, the subassembly 14, including the cooling and filtering device 76 and, barrier 64 fixedly positioned therein, is rotated beneath the inverted loaded subassembly 16 by power driven clutch means (not shown) to a speed, typically about 3000 revolutions per minute. Upon the attainment of such speed, the clutch is actuated to disconnect the power source and the freely spinning subassembly 14 is raised to bring the concentric ends of outer cylinder 22 and of inner cylinder 24 into contact, respectively, with the concentric ends of outer cylinder 28 and inner cylinder 30 of subassembly 16. The resulting friction stops the spinning in a fraction of a second but raises the temperature at the areas of contact sufficiently to cause consolidation thereat of the metal of the subassemblies 14 and 16. Pressure is maintained for a short period, for example, a second or two, to allow the welds 18 and 20 to solidify.

During the welding process, as previously noted, flashing 94 and 96 is created at the interface between the respective outer and inner cylinders of the subassemblies 14 and 16.

The weld flashing 94 and 96 is utilized to retain the metal barrier 66 in place.

Functioning of the gas generator assembly 10 begins with an electrical signal from a crash sensor (not shown) to the initiator 56. The initiator 56 fires into and pierces the rupturable container 40 that holds the igniter material 42. The igniter material 42 burns and the resulting flame flows through the exit openings or port holes 78 into the annular combustion chamber 72. The hot igniter gases ignite the gas generant pellets 86 which rapidly releases nitrogen gas. The resulting pressure in chamber 72 forces the metal barrier 66 against the cooling and filtering device 88 to move the device 88 into contact with the barrier 64. This closes the clearance space 92 and forces the gas to flow through exit openings 80 and device 88 for cooling and filtering before passing through the exit openings 82 in the metal barrier 64 into the cooling and filtering device 90. The device 90 serves further to cool the generated gas and to filter it, removing particulate residue therefrom. The generated gases then flow radially outwardly through the exit openings or ports 84 into the protective air bag (not shown) that is to be inflated.

Thus, there has been provided, in accordance with the invention, an improvement in a housing construction for gas generators that is characterized in its provision of maximum volume for the solid fuel gas generant composition thereby enabling a reduction in the bulk and weight of the gas generator assembly for a given material from which the housing construction is fabricated. The invention is further characterized in its simplicity of design, rugged construction and capability of being fabricated in large quantities at low cost.

While initiator 56 has been described herein as being a conventional electric squib associated with an external crash sensor, it will be understood that, if desired, an initiator and crash sensor of the type described and claimed in the copending application of George L. Stevens bearing Ser. No. 569,861, filed on Jan. 11, 1984, and assigned to the assignee of the present invention, may be substituted for the initiator 56 and the sensor associated therewith. With such a modified arrangement, the initiator and crash sensor would both be contained in the subassembly 16 and require no external connection thereto, the initiator being a percussion responsive type and the sensor comprising an inertial mass.

While a specific embodiment of the invention has been shown in detail to illustrate the application of the principles of the invention, it will be understood that the invention may be embodied otherwise without departing from such principles.

What is claimed:

1. A light weight housing construction of minimum bulk for gas generators using solid fuel for the generation of gas to inflate vehicle passive restraint inflatable crash protection bags comprising, first, second, third and fourth structural components, said first structural component forming a first generally cylindrical subassembly and including first and second concentric cylinders, each of which has an end, that extend from a first common substantially flat wall means integral therewith to form structural walls of the generator and at least one of which has exit holes for the passage of gas, said second structural component forming a second generally cylindrical subassembly and including third and fourth concentric cylinders, each of which has an end, that extend from a second common substantially flat wall means integral therewith to form structural walls of the generator, and at least one of which has exit holes for the passages of gas, the ends of said first and third and said second and fourth concentric cylinders providing mating surfaces to form therebetween, in cooperation with said first and second common wall means, inner and outer concentric chambers, said third and fourth structural components being annular and substantially flat in form and positioned in said outer concentric chamber to form therein three separate annular chambers that are concentric with all of said concentric cylinders with a first annular chamber located adjacent said second common wall means, a third annular chamber located adjacent said first common wall means and a second annular chamber located between said first and third annular chambers, with said first and second annular chambers extending between said third and fourth concentric cylinders and said third annular chamber extending between said first and second concentric cylinders, said third and fourth structural components having exit holes for the passages of gas from one to another of said first, second and third annular chambers, said first annular chamber containing a solid gas generant composition for the generation of gas and said second and third annular chambers each containing an individually associated cooling and filtering means, and means to join said first and second structural components together at the mating surfaces of said first and third and said second and fourth concentric cylinders, wherein said first and second subassemblies are structured so that for a given height and diameter of said first and second subassemblies there is provided in said first annular chamber a volume that extends out to the full inner diameter thereof, thus providing maximum volume for the containment therein of said solid gas generant composition and thereby enabling a reduction in the bulk and the weight of the gas generator housing construction for a given material from which the housing construction is fabricated.

2. A housing construction as defined by claim 1 wherein said fourth structural component is cooperation with said second common wall means forms said first annular chamber, and wherein all of the exit holes in each of said third and fourth structural components are disposed on a cricle that is concentric with said concentric cylinders, with the diameter of the circle of one of the sturctural components being substantially greater than that of the other structural component, whereby gas generated upon ignition of said solid gas generant composition in said first annular chamber is forced to travel radially in one direction in said second annular chamber and radially in the other direction in said third annular chamber.

3. A housing construction as defined by claim 2 including exit holes in said fourth concentric cylinder providing communication between said inner concentric chamber and said first annular chamber, said fourth concentric cylinder containing igniting materials, whereby upon ignition of said igniting materials flame therefrom passes through the exit holes in said fourth concentric cylinder to ignite said solid gas generant composition contained in said first annular chamber, and wherein said first concentric cylinder includes exit holes disposed adjacent said first common wall means.

4. A housing construction as defined by claim 3 wherein the exit holes in said third structural component are disposed on a circle that is adjacent said second concentric cylinder, and the exit holes in said fourth structural component are disposed on a circle that is adjacent said third concentric cylinder.

5. A housing construction as defined by claim 3, further including initiator means, wherein said ignition material and said initiator means are fixedly attached to said second structural component in said inner concentric chamber, said solid gas generant means contained in said first annular chamber being retained therein by said fourth structural component, said fourth structural component being fixedly attached to said second structural component, said cooling and filtering means are contained in said second annular chamber being fixedly attached to fourth structural component, and said cooling and filtering means contained in said third annular chamber being retained therein by said third structural component, and wherein said third structural component is fixedly attached to said first structural component.

6. A housing construction as defined by claim 5, wherein said first and second structural components are simultaneously joined together by inertia welding at the mating surface of said first and third and said second and fourth concentric cylinders, wherein during inertia welding a first clearance space is provided between said first structural component and said ignition material and initiator, and wherein a second clearance space is provided between the cooling and filtering means contained in said second annular chamber and said third structural component, whereby pressure developed in said first annular chamber upon ignition of solid gas generant composition contained therein moves said fourth structural component and thereby the colling and filtering means contained in said second annular chamber to close said second clearance space, thereby to force the generated gas to flow through the cooling and filtering means contained in said second annular chamber to the exit holes in said third structural component, the direction of such gas flow through said second annular chamber being axially and radially inwardly thereof.

7. A housing construction as defined by claim 1 wherein said first, second, third and fourth structural components are all made of aluminum.

* * * * *